United States Patent [19]

Owens et al.

[11] Patent Number: 5,465,983
[45] Date of Patent: Nov. 14, 1995

[54] REMOVABLE NOSEPIECES FOR CHUCKS AND SIMILAR TOOL HOLDERS

[75] Inventors: Valerie Owens, Townville; Louis M. Shadeck, Anderson; Robert O. Huff, Piedmont, all of S.C.

[73] Assignee: Jacobs Chuck Technology Corporation, Wilmington, Del.

[21] Appl. No.: 344,350

[22] Filed: Nov. 22, 1994

Related U.S. Application Data

[63] Continuation-in-part of Ser. No. 167,429, Dec. 15, 1993, Pat. No. 5,409,243.

[51] Int. Cl.[6] .................................................. B23B 31/12
[52] U.S. Cl. .................................................. 279/157; 279/60
[58] Field of Search .................................. 279/60–65, 157

[56] References Cited

U.S. PATENT DOCUMENTS

| | | | |
|---|---|---|---|
| 4,575,108 | 3/1986 | Whitehead | 279/59 |
| 4,664,394 | 5/1987 | Theissig et al. | 279/157 |
| 4,695,066 | 9/1987 | Rohm | 279/62 |
| 5,110,145 | 5/1992 | Stewart | 279/24 |
| 5,135,241 | 8/1992 | Huff et al. | 279/142 |
| 5,299,814 | 4/1994 | Salpaka | 279/157 |
| 5,409,243 | 4/1995 | Shadeck et al. | 279/157 |

FOREIGN PATENT DOCUMENTS

| | | |
|---|---|---|
| 436108 | 7/1991 | European Pat. Off. . |
| 853849 | 10/1952 | Germany . |
| 2243904 | 9/1972 | Germany . |
| 3512130 | 4/1985 | Germany . |

*Primary Examiner*—Steven C. Bishop
*Attorney, Agent, or Firm*—Fish & Neave; Robert R. Jackson

[57] ABSTRACT

A removable nosepiece for a chuck includes a plastic and/or metal ring which is removably mounted on a distal portion of either the main body or a sleeve of the chuck so that the ring is concentric with the central longitudinal axis of the chuck. The removable nosepiece may include a washer-shaped member of rubber extending radially inwardly from the plastic and/or metal ring. If provided, the rubber washer resiliently engages and centers a tool inserted into the chuck through the central aperture of the washer.

24 Claims, 4 Drawing Sheets

1

REMOVABLE NOSEPIECES FOR CHUCKS AND SIMILAR TOOL HOLDERS

This is a continuation-in-part of application Ser. No. 08/167,429, filed Dec. 15, 1993, now U.S. Pat. No. 5,409, 243.

BACKGROUND OF THE INVENTION

This invention relates to chucks and similar tool holders for releasably holding tools such as drill bits to manual or powered drivers. More particularly, the invention relates to removable nosepieces for chucks and similar tool holders such as collets.

Many chucks are now being constructed with exposed rubber or plastic parts or surfaces. For example, such chucks may have one or more exposed rubber or plastic parts or surfaces that are gripped by the user to tighten or loosen the chuck. The use of rubber or plastic in this way has several advantages over all-metal construction. One advantage is that the weight of the chuck tends to be reduced. Another advantage is that material cost for the chuck may be lowered. Still another advantage is that the greater coefficient of friction of rubber or plastic as compared to metal makes the chuck easier to operate without the need for a key or other appliance to tighten the chuck on a tool or to subsequently loosen the chuck to release the tool.

A possible disadvantage of exposed rubber or plastic parts or surfaces is that they tend to wear more easily, more rapidly, and more severely than similarly located metal parts or surfaces. An area in which such wear tends to most rapid and severe is adjacent the distal end or "nose" of the chuck. It is here that the chuck is most frequently impacted by flying debris from the work being performed by the tool gripped by the chuck. The rapidly rotating nose of the chuck may also suddenly come into contact with a stationary workpiece when the tool held in the chuck breaks through the workpiece. This may cause considerable wear on or damage to rubber or plastic on the nose of the chuck.

In view of the foregoing, it is an object of this invention to provide improved chucks with plastic or rubber parts or surfaces.

It is another object of this invention to facilitate protection and/or renewal of rubber or plastic parts of a chuck, especially at or near the nose of the chuck.

SUMMARY OF THE INVENTION

These and other objects of the invention are accomplished in accordance with the principles of the invention by providing removable and replaceable nosepieces for chucks. The removable nosepiece may be a plastic ring. If desired, the nosepiece may include a resilient rubber member in the shape of a washer concentric with the ring and extending into the region bounded by the ring. Such a rubber member helps to preliminarily center and hold a tool such as a drill bit inserted in the chuck. The rubber member also helps to keep debris out of the chuck mechanism. The plastic ring may be at least partly clad with metal, especially on its distal region when mounted on the chuck.

As an alternative to the foregoing, the removable nosepiece may be a metal ring that is removably mounted on the distal end of the chuck. The metal ring typically contains rubber or plastic as a spacer element between a distal portion of the chuck and a still more distal portion of the metal ring. A washer-like resilient rubber member, such as has been described above, may be provided in the region surrounded by the metal ring for purposes similar to those that have been previously mentioned.

Further features of the invention, its nature and various advantages will be more apparent from the accompanying drawings and the following detailed description of the preferred embodiments.

BRIEF DESCRIPTION OF THE DRAWINGS

FIG. 4 is taken along the line 4—4 in FIG. 5.

FIG. 6 is taken along the line 6—6 in FIG. 7.

FIG. 8 is taken along the line 8—8 in FIG. 9.

FIG. 10 is taken along the line 10—10 in FIG. 11.

DETAILED DESCRIPTION OF THE PREFERRED EMBODIMENTS

Figure 1:
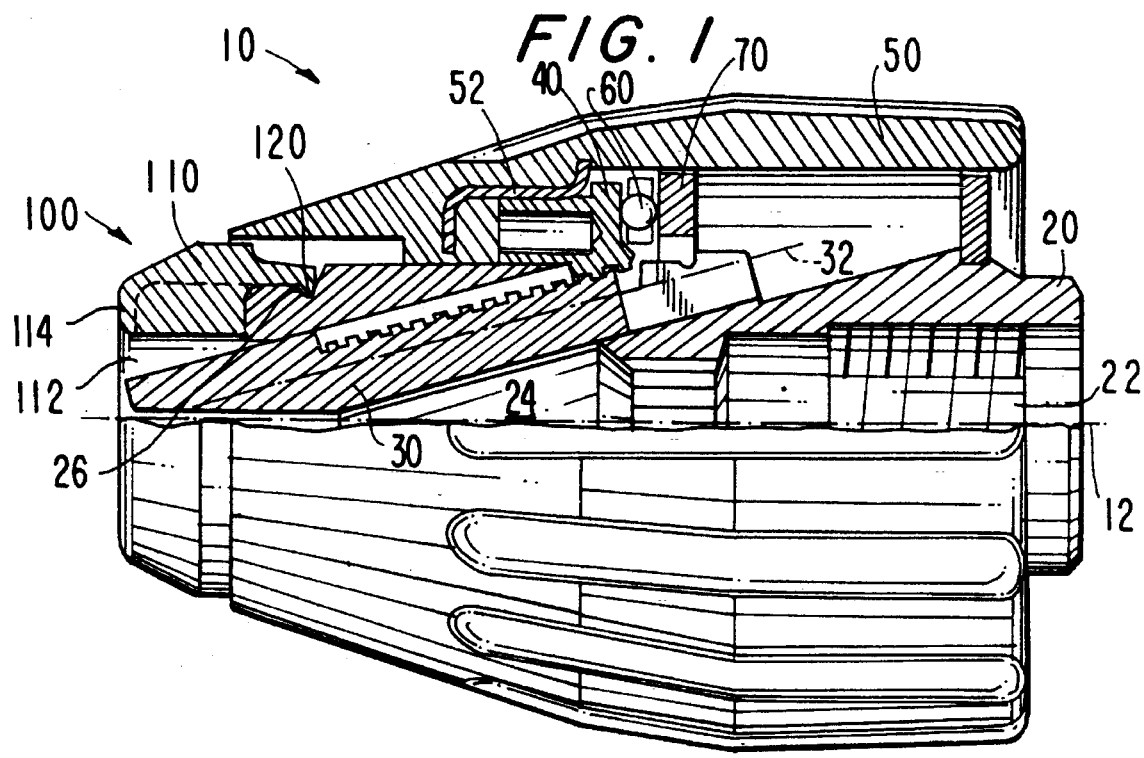
FIG. 1 is an elevational view, partly in section, showing a first illustrative embodiment of the invention.

A first illustrative embodiment of the invention is shown in FIG. 1. In this embodiment chuck 10 has a main body member 20 of metal (e.g., steel). Three metal jaws 30 (only one of which is visible in FIG. 1) are mounted in body 20. Jaws 30 are equally spaced from one another around the central longitudinal axis 12 of the chuck. Jaws 30 are inclined toward one another in the distal direction along axis 12. Each jaw 30 is movable in either direction along its inclined longitudinal axis 32 in response to rotation of nut 40 relative to body 20 about axis 12. The direction of motion of jaws 30 is determined by the direction of rotation of nut 40 relative to body 20. Nut 40 is rotated by rotation of sleeve 50, which may be a hollow, annular, plastic member concentric with axis 12. A metal reinforcing ring 52 may be molded into sleeve 50 in the immediate vicinity of nut 40. Easy rotation of nut 40 is facilitated by annular ball bearing assembly 60 in contact with the proximal surface of nut 40. The proximal side of ball bearing assembly 60 bears on annular bearing race 70, which is fixedly mounted on body 20.

Body 20 has a concentric proximal bore 22 for receiving the distal end of a spindle of a manual or powered driver (not shown). In the vicinity of the distal ends of jaws 30 body 20 has a distal bore 24 for receiving the shank or proximal end of any of several sizes of tools (e.g., drill bits) that the chuck is capable of gripping between its jaws.

The removable nosepiece 100 of this invention is removably mounted on the distal end of body 20. In this embodiment nosepiece 100 is a plastic ring or toroidal member 110 concentric with axis 12. A proximal portion of member 110 includes an annular bead 120 which projects radially inward from the immediately adjacent portions of member 110. When member 110 is on chuck 10 as shown in FIG. 1, bead 120 snaps into a complementary annular groove 26 in body 20 to releasably hold the nosepiece on the chuck. Nosepiece 100 is thereby latched securely to chuck 10, but this latching can be overcome when it is desired to remove the nosepiece (e.g., by prying the nosepiece off with a screwdriver inserted into the central aperture 112 of the nosepiece).

It will be observed from FIG. 1 that when nosepiece 100 is on chuck 10, the distal surface 114 of member 110 becomes the distal-most surface of the chuck. This is the portion of the chuck surface which is most subject to wear or damage (e.g., from debris or from inadvertent contact with workpieces). Because nosepiece 100 is more distal than the other plastic component of the chuck (i.e., sleeve 50), the nosepiece protects that other plastic component. If and when nosepiece 100 becomes unacceptably worn or damaged, it can be easily removed and replaced as has been described.

Figure 2:
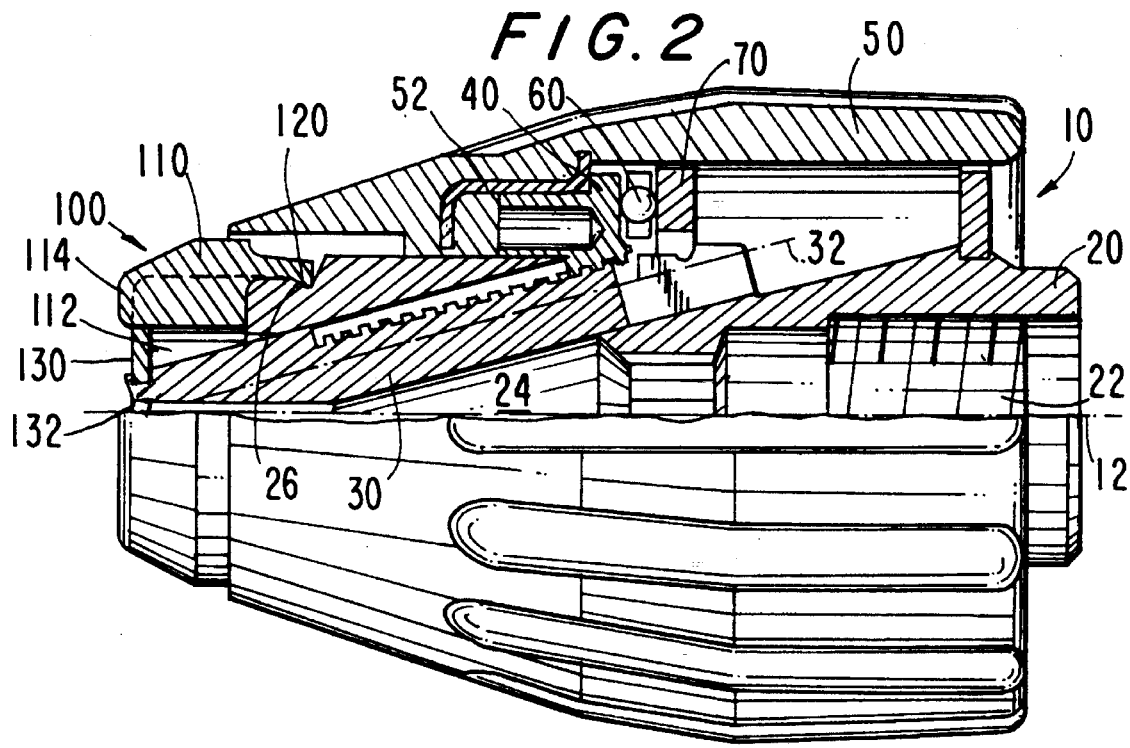
FIG. 2 is a view similar to FIG. 1 showing a second illustrative embodiment of the invention.

FIG. 2 shows an alternate embodiment which is similar to FIG. 1 except that a rubber web or membrane 130 in the shape of a washer is provided concentrically in the central aperture 112 of member 110. (With jaws 30 in the extreme distal position shown in FIG. 2, the distal ends of the jaws may tend to deform member 130 outwardly. For simplicity, however, this possible deformation of member 130 is not shown in FIG. 2.) Member 130 is preferably integral with member 110. For example, member 130 may be formed first and then used as an insert in the mold in which member 110 is formed. Member 130 has a central aperture 132 through which a tool can be inserted for gripping by jaws 30. Assuming that the tool is at least as large as aperture 132, member 130 resiliently engages the tool and helps to center and hold it prior to engagement by jaws 30. When the tool is being used, member 130 helps to keep debris from entering the chuck around the shank of the tool.

As shown in FIG. 2, member 130 is preferably recessed in the proximal direction from the distal end of member 110. This is desirable so that the harder plastic ring 110 provides the most distal surface 114 of the chuck, and so that the more delicate rubber of member 130 is somewhat protected. However, if member 130 or any other part of nosepiece 100 in FIG. 2 becomes unacceptably worn or damaged, the FIG. 2 nosepiece can be removed and replaced as described above in connection with FIG. 1.

Figure 3:
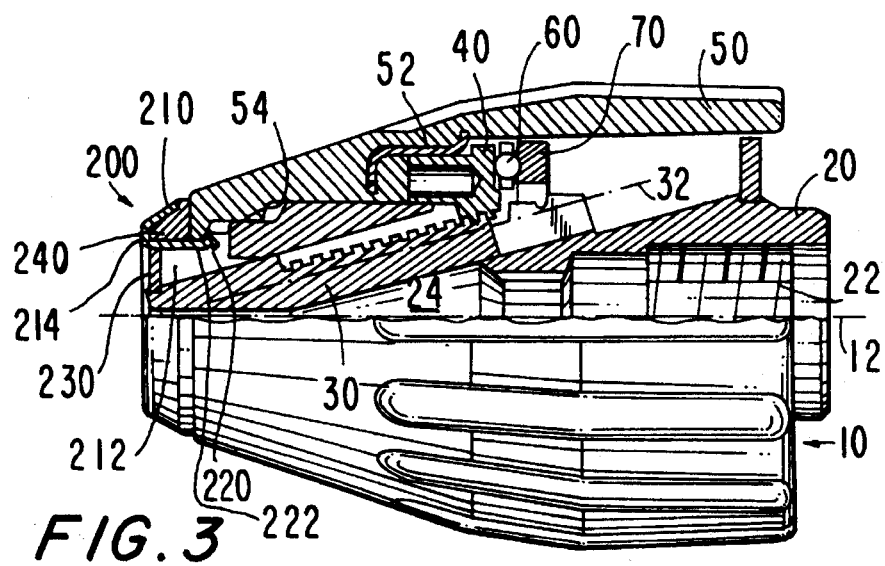
FIG. 3 is another view generally similar to FIGS. 1 and 2 showing a third illustrative embodiment of the invention.

FIG. 3 shows another alternative embodiment of the invention. Although there are some differences between the chuck shown in FIGS. 1 and 2, on the one hand, and the chuck shown in FIG. 3, on the other hand, the same reference numbers are used in all of these FIGS. for chuck parts that are basically similar. In this embodiment removable nosepiece 200 includes a metal ring 210 concentric with axis 12. Metal ring 210 releasably latches onto the distal portion of sleeve 50. In particular, metal ring 210 has a plurality of proximally extending fingers 222 spaced from one another in the circumferential direction around the ring. Each finger 222 has a radially outwardly extending ridge 220 which releasably latches behind a complementary annular shoulder 54 inside sleeve 50 to releasably hold ring 210 on the distal end of chuck 10. Fingers 222 resiliently deflect radially inwardly to allow nosepiece 200 to be placed on or removed from the chuck. For example, removal of nosepiece 200 can be accomplished by forcing a screwdriver in between the distal face of sleeve 50 and the adjacent face of nosepiece 200 and prying the nosepiece off. When nosepiece 200 is on the chuck, the distal surface 214 of ring 210 becomes the distal-most surface of the chuck.

As can be seen in FIG. 3, metal ring 210 is a cover or cladding for another ring 240 of rubber or plastic. Ring 240 may help maintain the ring 210 in the proper position on chuck 10 (e.g., by acting as a spacer between the distal end of the chuck and a distal portion of ring 210 as shown in FIG. 3). Ring 240 may also provide an anchor for a rubber, washer-shaped member 230 (similar to member 130 in FIG. 2) in the area 212 bounded by ring 210. For example, member 230 may be integral or one-piece with ring 240 through small apertures (not shown) in ring 210. Member 230 provides all the functions that member 130 in FIG. 2 provides. As in FIG. 2, member 230 is preferably recessed from the distal-most surface 214 of ring 210 to somewhat protect member 230.

Figure 4:
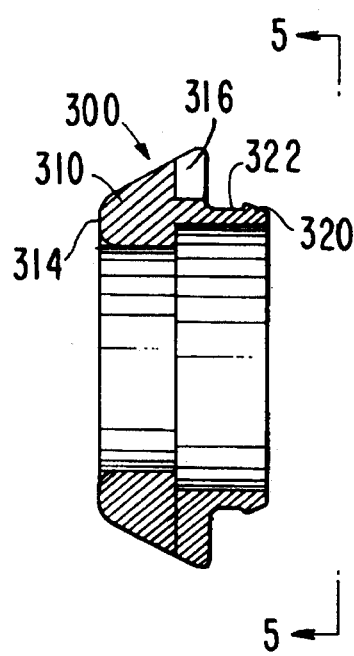
FIG. 4 is a sectional view showing a fourth illustrative embodiment of the invention.
Figure 5:
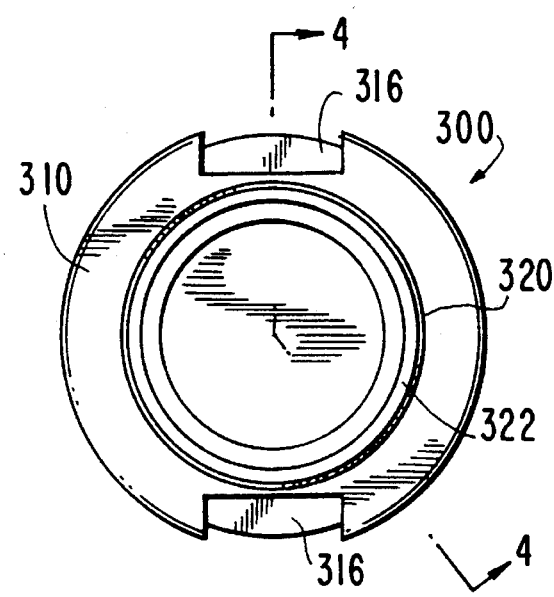
FIG. 5 is an elevational view of the apparatus shown in FIG. 4 taken in the direction 5—5 in FIG. 4.

Still another alternative embodiment of the invention is shown in FIGS. 4 and 5. The depiction of a chuck is not repeated in FIGS. 4 and 5, but the chuck usable with this embodiment can be similar to the chuck shown in FIG. 3, and this will be the chuck assumed in the following discussion. In the embodiment shown in FIGS. 4 and 5 the removable nosepiece 300 is a plastic ring or toroidal member 310. Member 310 is removably mountable on the distal portion of a chuck sleeve 50 in the manner shown in FIG. 3. Thus radially outwardly projecting annular bead 320 on the proximally extending portion 322 of member 310 releasably latches behind a complementary shoulder 54 (FIG. 3) inside the chuck sleeve. When member 310 is mounted on the chuck in this manner, the distal surface 314 of member 310 becomes the distal-most surface of the chuck.

When it is desired to remove nosepiece 300 from the chuck, the end of a screwdriver can be inserted in either of two diametrically opposite recesses 316 formed in a proximal-facing surface of member 310 which abuts the distal-most surface of chuck sleeve 50 (FIG. 3). This facilitates prying the nosepiece 300 off the chuck. The material of elements 50 and 310 is sufficiently elastic to allow bead 320 to disengage from shoulder 54 when nosepiece 300 is thus pried off.

Figure 6:
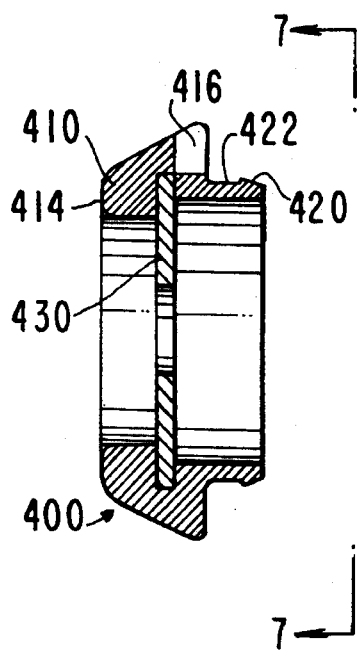
FIG. 6 is a sectional view showing a fifth illustrative embodiment of the invention.
Figure 7:
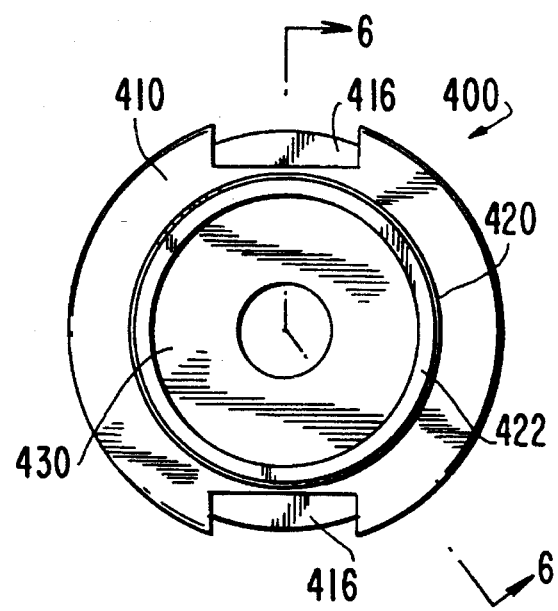
FIG. 7 is an elevational view of the apparatus shown in FIG. 6 taken in the direction 7—7 in FIG. 6.

The further alternative embodiment shown in FIGS. 6 and 7 is similar to the embodiment of FIGS. 4 and 5, but with the addition of a rubber, washer-shaped member 430 similar to member 130 in FIG. 2 or member 230 in FIG. 3. Parts in FIGS. 6 and 7 that are similar to parts in FIGS. 4 and 5 have reference numbers that are increased by 100 from the reference numbers used in FIGS. 4 and 5. These parts will not all be discussed in detail again. Rubber washer 430 is preferably integral with member 410 (e.g., by being used as an insert in the mold in which member 410 is formed). Member 430 performs all the functions described above for similar members 130 and 230. As in the previously described embodiments, member 430 is preferably recessed from the distal surface 414 of plastic member 410 so that the harder plastic is the distal-most surface of the chuck and member 430 is somewhat protected.

The still further alternative embodiment shown in FIGS.

Figure 8:
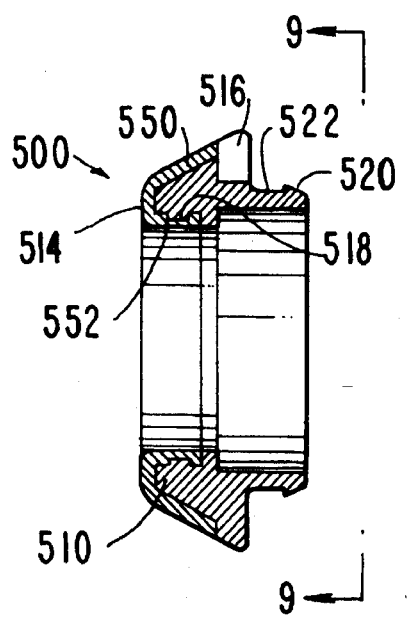
FIG. 8 is a sectional view showing a sixth illustrative embodiment of the invention.
Figure 9:
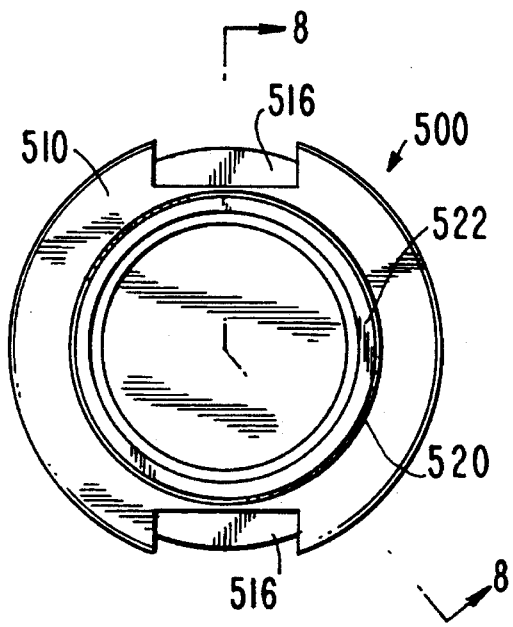
FIG. 9 is an elevational view of the apparatus shown in FIG. 8 taken in the direction 9—9 in FIG. 8.

8 and 9 is again similar to the embodiment shown in FIGS. 4 and 5, but with the addition of a metal ring 550 covering a major portion of the distal surface of plastic ring 510. Parts in FIGS. 8 and 9 that are similar to parts in FIGS. 4 and 5 have reference numbers that are increased by 200 from the FIGS. 4 and 5 reference numbers. Removable nosepiece 500 is again usable with a chuck of the type shown in FIG. 3, and it is removably mounted on such a chuck in the same way that nosepieces 300 (FIGS. 4 and 5) and 400 (FIGS. 6 and 7) are removably mountable on such a chuck. Metal ring 550 is integral with plastic ring 510. For example, metal ring 550 may be an insert in the mold in which plastic ring 510 is molded. To help ensure permanent union of rings 510 and 550, ring 510 has an annular bead 518 that projects radially inwardly into a complementary annular groove 552 in metal ring 550. When nosepiece 500 is mounted on a chuck, the distal surface 514 of metal ring 550 becomes the distal-most surface of the chuck.

Figure 10:
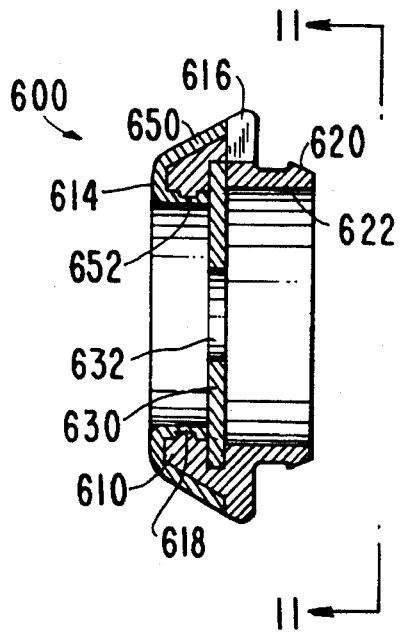
FIG. 10 is a sectional view showing a seventh illustrative embodiment of the invention.
Figure 11:
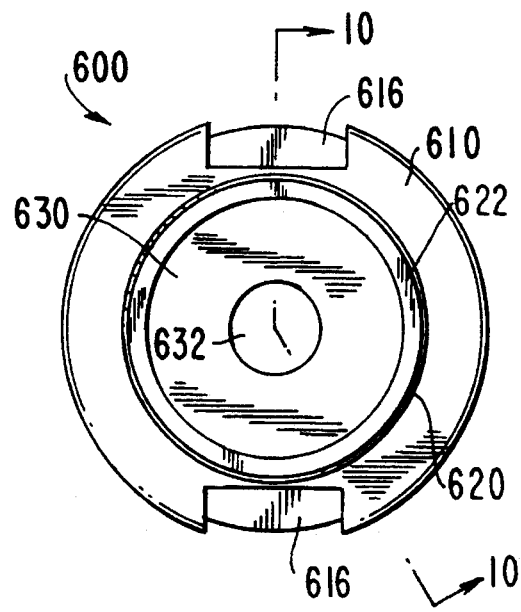
FIG. 11 is an elevational view of the apparatus shown in FIG. 10 taken in the direction 11—11 in FIG. 10.

FIGS. 10 and 11 show yet another alternative embodiment of the invention. This embodiment is a combination of the embodiment of FIGS. 6 and 7 and the embodiment of FIGS. 8 and 9. In FIGS. 10 and 11 parts that are similar to parts in FIGS. 6–9 have reference numbers that are increased by 200 from the reference numbers used in FIGS. 6 and 7 and/or increased by 100 from the reference numbers used in FIGS. 8 and 9. Thus removable nosepiece 600 includes a plastic ring 610 partly covered by metal ring 650. Washer-shaped rubber ring 630 extends radially into the area surrounded by rings 610 and 650 so that a tool inserted through the central aperture 632 in ring 630 will be resiliently engaged and centered by ring 630. Ring 630 has all the same attributes as similar, previously described rings 130, 230, and 430. Nosepiece 600 is removably mountable on the sleeve 50 of a chuck similar to that shown in FIG. 3 in the same way that previously described embodiments 300, 400, and 500 are removably mountable on such a chuck. When nosepiece 600 is thus mounted, the distal surface 614 of metal ring 650 becomes the distal-most surface of the chuck. Metal ring 650 offers even more protection for the distal end of the chuck than plastic rings such as 310 (FIGS. 4 and 5) or 410 (FIGS. 6 and 7). Rubber ring 630 is recessed from surface 614 so that ring 630 is somewhat protected and the distal-most surface of the chuck remains metal.

Figure 12:
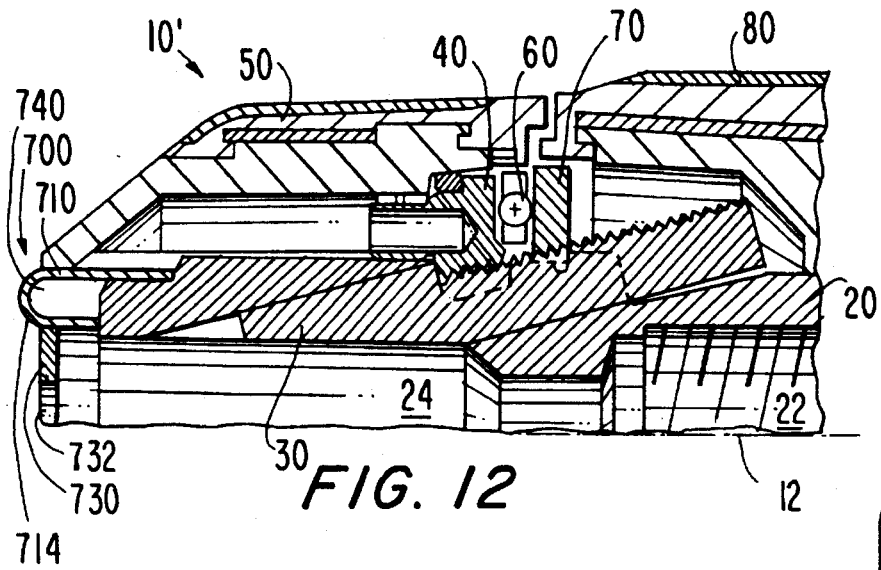
FIG. 12 is a partial sectional view showing an eighth illustrative embodiment of the invention.

FIG. 12 shows still another alternative embodiment of the invention. This embodiment is quite similar to the embodiment shown in FIG. 3 except that metal ring 710 is removably mounted on chuck body 20 rather than on chuck sleeve 50 as in FIG. 3. FIG. 12 shows a slightly different type of chuck 10' than is shown in FIGS. 1–3. The significant difference is that chuck 10' has a second plastic sleeve 80 that is secured to body 20 adjacent the proximal end of the chuck. (In other respects chuck 10' is similar to the previously described chucks, and common reference numbers are used for similar parts.) With two sleeves 50 and 80, nut 40 is rotated relative to body 20 by gripping each sleeve in a separate hand and rotating the sleeves relative to one another. In the previously described chucks the nut is rotated either by holding sleeve 50 while the chuck driver is powered in the forward or reverse direction, or if the driver has a spindle lock, by rotating sleeve 50 while holding the driver stationary.

Figure 13:
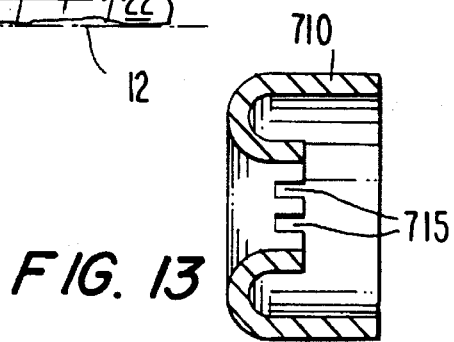
FIG. 13 is a sectional view of one part of the apparatus shown in FIG. 12.

Considering now the removable nosepiece 700 shown in FIG. 12, metal ring 710 is the distal-most component of that nosepiece, and when nosepiece 700 is mounted on a chuck, the distal surface 714 of metal ring 710 becomes the distal-most surface of the chuck. Rubber ring 740 is formed within metal ring 710 and is integral with rubber washer 730 which extends radially in from ring 710. For example, rings 740 and 730 may be integral with one another through slots or apertures 715 in ring 710 (see FIG. 13 which shows ring 710 without chuck 10' and without any of the rubber parts.) Thus rings 740 and 730 may be molded substantially simultaneously and as one piece in a mold in which ring 710 is an insert. As in the previously described embodiments, rubber washer 730 is recessed from the distal-most surface 714 of metal ring 710.

It will be understood that the foregoing is only illustrative of the principles of this invention, and that various modifications can be made by those skilled in the art without departing from the scope and spirit of the invention. For example, instead of a continuous annular bead such as 120 or 320 on plastic rings that mate with the chuck, such plastic rings can be made with separate, circumferentially spaced fingers (similar to metal fingers 222 in FIG. 3), each finger carrying a bead segment or other suitable latching structure for releasably engaging the chuck. As another example of a possible modification, the shapes of the latching structures on the removable nosepiece and the chuck can be reversed so that in FIG. 1, for example, a bead on the chuck snaps into a groove in the removable nosepiece. Any of the various types of chucks shown herein, or other conventional chucks, can be used with any of the removable nosepieces shown herein. The variety of embodiments shown herein illustrates the point that the removable nosepieces of this invention can be made to attach to either the chuck body or a sleeve of the chuck, and that they can be made either with or without the rubber tool-centering washer.

The invention claimed is:

1. A plastic nosepiece for a chuck comprising:

a toroidal member of plastic removably mounted on a distal portion of said chuck so that when said member is mounted on said chuck, said member is substantially concentric with a tool inserted in said chuck and a distal surface of said member becomes the distal-most surface of said chuck.

2. The apparatus defined in claim 1 further comprising:

an annular rubber washer substantially concentric with said member and extending radially inwardly into space surrounded by said member for resiliently engaging a tool inserted into said chuck through a central aperture in said washer, said washer being recessed from said distal surface of said member.

3. The apparatus defined in claim 1 wherein a proximal portion of said member includes a latch structure for releasably latching said member to a complementary latch structure on said chuck.

4. The apparatus defined in claim 3 wherein said latch structure of said member includes a raised bead on said member.

5. The apparatus defined in claim 4 wherein said raised bead projects radially outward from adjacent portions of said member.

6. The apparatus defined in claim 5 wherein said raised bead extends annularly around said member.

7. The apparatus defined in claim 4 wherein said raised bead projects radially inward from adjacent portions of said member.

8. The apparatus defined in claim 7 wherein said raised bead extends annularly around said member.

9. The apparatus defined in claim 1 wherein said chuck includes a body member having a toroidal distal portion which is substantially concentric with said member, and wherein said member is removably mounted on said chuck by releasably engaging said body member.

10. The apparatus defined in claim 1 wherein said chuck includes a body member having a toroidal distal portion which is substantially concentric with said member, and a toroidal sleeve member mounted concentrically relative to said body member for rotation relative to said body member about an axis with which said body member and said sleeve member are concentric, and wherein said member is removably mounted on said chuck by releasably engaging said sleeve member.

11. A nosepiece for a chuck comprising:
   a first toroidal member of plastic removably mounted on a distal portion of said chuck so that when said first member is mounted on said chuck, said first member is substantially concentric with a tool inserted in said chuck; and
   a second toroidal member of metal concentrically mounted on a distal surface of said first member so that when said first member is mounted on said chuck, a distal surface of said second member becomes the distal-most surface of said chuck.

12. The apparatus defined in claim 11 further comprising:
   an annular rubber washer substantially concentric with said first member and extending radially inwardly into space surrounded by said first member for resiliently engaging a tool inserted into said chuck through a central aperture in said washer, said washer being recessed from said distal surface of said second member.

13. The apparatus defined in claim 11 wherein a proximal portion of said first member includes a latch structure for releasably latching said first member to a complementary latch structure on said chuck.

14. The apparatus defined in claim 13 wherein said latch structure of said first member includes a raised bead on said first member.

15. The apparatus defined in claim 14 wherein said raised bead projects radially outward from adjacent portions of said first member.

16. The apparatus defined in claim 15 wherein said raised bead extends annularly around said first member.

17. The apparatus defined in claim 14 wherein said raised bead projects radially inward from adjacent portions of said first member.

18. The apparatus defined in claim 17 wherein said raised bead extends annularly around said first member.

19. The apparatus defined in claim 11 wherein said chuck includes a body member having a toroidal distal portion which is substantially concentric with said first member, and wherein said first member is removably mounted on said chuck by releasably engaging said body member.

20. The apparatus defined in claim 11 wherein said chuck includes a body member having a toroidal distal portion which is substantially concentric with said first member, and a toroidal sleeve member mounted concentrically relative to said body member for rotation relative to said body member about an axis with which said body member and said sleeve member are concentric, and wherein said first member is removably mounted on said chuck by releasably engaging said sleeve member.

21. A nosepiece for a chuck comprising:
   a first toroidal member of metal removably mounted on a distal portion of said chuck so that when said first member is mounted on said chuck, said first member is substantially concentric with a tool inserted in said chuck and a distal surface of said first member becomes the distal-most surface of said chuck; and
   a second toroidal member concentrically mounted on said first member so that when said first member is mounted on said chuck, at least a portion of said second member is disposed between a portion of said first member and a portion of said chuck, said second member being made from a material selected from the group consisting of rubber and plastic.

22. The apparatus defined in claim 21 wherein said first member has a plurality of circumferentially spaced fingers extending proximally from a remainder of said first member, and wherein said first member is removably mounted on said chuck by releasable engagement of said chuck by said fingers.

23. The apparatus defined in claim 22 wherein each of said fingers includes a latching structure for releasably engaging a complementary latching structure on said chuck.

24. The apparatus defined in claim 23 wherein said latching structure on each of said fingers includes a ridge projecting in a radial direction from adjacent portions of said finger.

* * * * *